2,824,045

MICROBIAL PRODUCTION OF FOLINIC ACID

David Hendlin, Elizabeth, N. J., assignor to Merck & Co., Inc., Rahway, N. J., a corporation of New Jersey No Drawing. Application March 19, 1954
Serial No. 417,511

9 Claims. (Cl. 195—96)

This invention relates to physiologically active substances. More particularly, this invention is concerned with novel methods of producing folinic acid, also called citrovorum factor.

Folinic acid has become of increased importance in view of recent findings. Thus, considerable evidence has been accumulated which indicates folic acid must first be converted to folinic acid before the desired physiological responses are obtained in animal tissues. In other words, folinic acid may actually be the active compound in vivo. Since the ability to convert folic acid to folinic acid in vivo may be impaired by the presence of certain diseases it obviously follows that folinic acid per se should be administered for successful treatment.

It is known that folic acid may be converted chemically to folinic acid. The resulting yields of folinic acid, however, are not good and, since folic acid is an expensive starting material, the process is not satisfactory economically. Although various fungi contain folinic acid naturally, the amounts of this compound normally present are so small as to prohibit its commercial recovery.

An object of this invention, therefore, is to provide a practical and economically feasible process of producing folinic acid by biochemical methods. Another object is to provide a process in which high yields of folinic acid are obtained. A further object is to provide a process of producing folinic acid which utilizes readily available starting materials. It is also an object to provide novel methods of recovering folinic acid. Other objects will be apparent from the following description of the invention.

It has been discovered, according to the present invention, that folinic acid can be produced in high yields by subjecting folic acid and folic acid like compounds to the action of the microorganisms Streptococcus faecalis and Lactobacillus casei. Strains of these microorganisms such as S. faecalis A. T. C. C. 8043 and L. casei A. T. C. C. 7469 which are suitable for carrying out the processes of the present invention, are available from the American Type Culture Collection, Washington, D. C. Complementary to this discovery is the finding that even higher yields can be attained by effecting the production of folinic acid by these methods in the presence of ascorbic acid. In addition, it has been established that certain bound forms of folinic acid produced according to this invention may be enzymatically treated to produce additional quantities of free folinic acid.

Folinic acid can be produced according to this process by subjecting folic acid or a folic acid like compound to the action of either growing or resting cells of S. faecalis or L. casei. Either procedure results in formation of the desired folinic acid.

In addition to folic acid, similar compounds having the basic folic acid structure may be used as suitable precursors for the production of folinic acid. Thus, compounds such as $N^{10}$-formylfolic acid, $N^2$-acetyl-$N^{10}$-formylfolic acid, $N^2$-acetylfolic acid, N-{p[(2-acetamido-4-hydroxy-6-pteridylmethylene) imino]benzoyl} glutamic acid and N-{p[(2-amino-4-hydroxy-6-pteridylmethylene) imino]benzoyl} glutamic acid and the like can be employed.

To produce folinic acid by or during growth of S. faecalis or L. casei it is only necessary to have the folic acid or folic acid like compound present as the organism grows. This can be conveniently effected by adding folic acid or a folic acid like compound to commonly used nutrient media for these organisms. Such media are easily prepared by methods available to those skilled in the art. Such media may contain, for example, the usual sources of an assimilable form of carbon, such as various carbohydrates, e. g. molasses, sugars. The nitrogen requirements of the organisms can be supplied by the addition of proteins, meat extract, soy bean meal, corn steep liquor, amino acids and the like. Minerals such as cobalt, calcium, iron, magnesium, etc. may also be used to supplement the media.

The amount of folic acid or folic acid like compound which should be present to produce folinic acid during growth of the organism is not critical. It has been found though, that amounts no greater than 0.001 µg. of folic acid per ml. of nutrient medium are adequate to give good yields of folinic acid. Larger amounts of folic acid and folic acid like compounds may be used if desired.

Surprisingly, it has been found that if ascorbate ions are present during production of folinic acid by this method even greater yields of the desired product can be attained. Thus, the presence of ascorbic acid raises the yields of folinic acid to 3–10 times those attained in its absence by this process. Ascorbic acid may be used as a source of ascorbate ions or, if desired, an equivalent thereof, such as sodium ascorbate can be employed.

After maximum growth of the organism has been attained the folinic acid may be recovered directly according to procedures described hereinafter or, preferably, the fermentation broth may be subjected to enzymatic action to release that part of the folinic acid which is produced in a bound or conjugated form during the process. Liberation of folinic acid from bound forms is conveniently achieved by subjecting the broth, or filtered broth, to enzymes found in such substances as dried chicken pancreas, chicken liver and hog kidney. In effecting the release of folinic acid one such material is added to the broth or filtered broth and the mixture is incubated at 37° C. overnight. The enzyme is then destroyed by steaming the mixture and the folinic acid may be recovered as described later.

As mentioned previously, folinic acid may be produced by subjecting folic acid and folic acid-like compounds to the action of resting cells of L. casei and S. faecalis. In this method the grown cells are supplied with folic acid or a folic acid-like compound in an aqueous buffered suspension under conditions not conducive to growth of the cells. The suspensions are merely incubated, such as at 37° C., overnight to produce folinic acid. The amount of folinic acid produced by the resting cells is approximately proportional to the amount of folic acid or folic acid-like compound present in the suspension. The presence of ascorbic acid or its equivalent, while the resting cells are acting on the folic acid-like compounds, serves to aid production of exceptionally high yields of folinic acid.

Following the incubation period with the resultant production of folinic acid the suspension is steamed to destroy the activity of the resting cells. The suspension may then be treated with chicken pancreas and the like as described above to liberate that part of the folinic acid produced in bound form.

The folinic acid can be recovered, whether produced by growing or resting cells, by filtering the resulting broth or supernatant liquid and evaporating the filtrate to dryness. The folinic acid produced by such a direct recovery procedure, however, contains various impurities. The purity of folinic acid can be increased greatly by the finding that it may be adsorbed on charcoal and subsequently eluted therefrom and that in a water-butanol system folinic acid is in the aqueous phase at a pH of about 6–7 and in the butanol phase at about pH 3.

In recovering folinic acid of high purity employing the findings just mentioned it is ordinarily preferred to effect the adsorption purification step first. This is conveniently effected by contacting an aqueous solution of the folinic acid such as is obtained by filtration of the broth or incubated suspension of the resting cells with activated charcoal, preferably in the form of a column. The adsorbed folinic acid can be readily eluted from the charcoal such as with an aqueous solution of acetone containing a small amount of ammonium hydroxide. Further purification of the folinic acid is attained by evaporating the eluate to a small volume, adding butanol and extracting with water. The aqueous extract containing the folinic acid is adjusted to about pH 3 with hydrochloric acid and extracted with butanol. Separation of the folinic acid is conveniently achieved by azeotropically distilling the butanol extract until the water is removed. The folinic acid precipitates from the anhydrous butanol and can be filtered and dried. The product may be reextracted with water-butanol if desired. It may also be chromatographed from methanol over alumina and eluted with 50% aqueous methanol containing a small amount of ammonium hydroxide.

The following examples are included to illustrate but not limit the invention.

Example 1

*Streptococcus faecalis* and *Lactobacillus casei* are grown in the amino acid medium of Stokes and Gunness, J. Biol. Chem. 157, 651 (1945), supplemented with 0.001 μg. of folic acid per ml. of medium. Trypsinized casein (3 mg. per ml.) is added to the *L. casei* medium as a source of strepogenin to eliminate a lag in early growth. Incubation is carried out at 37° C. for 17 to 20 hours in one or two liter batches under deep layer conditions to enhance growth.

The assay procedure used for determination of folinic acid production is essentially that of Sauberlich and Baumann, J. Biol. Chem. 176, 165 (1948) with minor modifications. In the assay procedure as employed, 5 ml. of solution is used. A folinic acid concentrate obtained from liver and assaying $3 \times 10^6$ units per mg. is used as the standard. Under the conditions of assay 0.4 unit per ml. is required for half maximal growth of the test organism.

After the fermentation is completed, the broth and supernatant liquid are assayed for folinic acid activity. In addition, aliquots of the broth and supernatant liquid are subjected to the enzymatic action of dried chicken pancreas in a concentration of about 1 mg./ml. with incubation at 37° C. overnight followed by assay for folinic acid. The following results were obtained:

| Organism | Folinic Acid/Units Per Ml. | | | |
|---|---|---|---|---|
| | Whole Broth | | Supernatant | |
| | A# | B# | A# | B# |
| L. casei | 0.5 | 1 | 0.5 | 1 |
| S. faecalis | 2 | 18 | 3 | 11 |

A#=sample assayed as is.
B#=sample treated with chicken pancreas prior to assay.

These data show that *L. casei* and *S. faecalis* synthesize folinic acid when grown on a nutrient medium in the presence of folic acid. These data also show that some folinic acid is produced in a bound or conjugated form, but that it can be released enzymatically.

In the isolation of the folinic acid the broth is first filtered and the desired product is adsorbed on activated charcoal. The charcoal is eluted with an aqueous 50% acetone—10% ammonium hydroxide solution and the eluate is concentrated to a small volume. It is then adjusted to pH 6.0 and extracted with butanol. The butanol extract is discarded. The remaining aqueous solution is adjusted to pH 3 and again extracted with butanol. After adjusting the butanol extract to pH 7 it is extracted with water. The aqueous extract is adjusted to pH 3 and extracted with butanol. The butanol extract is azeotropically distilled until anhydrous whereupon folinic acid separates and is recovered.

The folinic acid is further purified by dissolution in methanol followed by chromatography over alumina. Elution with aqueous 50% methanol—1% ammonium hydroxide gives an eluate containing the folinic acid. The eluate is adjusted to pH 3 and extracted with butanol. After azeotropically distilling the butanol extract until all water is removed, the folinic acid precipitates from the anhydrous butanol and is recovered and dried.

Example 2

*Streptococcus faecalis* is grown as in Example 1. The grown cells are harvested by centrifugation, washed twice with M/15 phosphate buffer at pH 8.0. The cells are then suspended in the buffer supplemented with 0.8 percent glucose in a concentration of approximately 4.0 to 6.0 mg. of cells per ml. of suspending medium. Calculated amounts of folic acid or $N^{10}$ formyl folic acid are added to aliquots of the buffered suspension of resting cells. One aliquot is used as a blank control. No ascorbic acid is added to any of the aliquots. Each suspension is incubated at 37° C. for 17 hours and then steamed for 10 minutes. Part of each suspension is then treated with chicken pancreas as in Example 1. All samples are assayed for folinic acid activity which is reported in units per mg. dry cell weight determined after drying overnight at 100° C.

| Suspension | Folinic Acid Activity, Units Per Mg. Cells | |
|---|---|---|
| | No Enzyme | Enzyme Treated |
| Cells alone | 20 | 73 |
| Cells plus 2 μg. of folic acid | 31 | 100 |
| Cells plus 2 μg. of $N^{10}$ formyl folic acid | 36 | 98 |

Thus, it is clear that folic acid or $N^{10}$ formyl folic acid when contacted with *S. faecalis* are utilized to produce folinic acid and that the amount of free folinic acid produced can be increased by treating the suspension with a suitable enzyme after incubation.

The folinic acid activity found in the suspension of the cells alone is due to the fact that the resting cells of *S. faecalis* used in this experiment must be obtained by growing the organism in the presence of folic acid. During this growth, folinic acid is produced as shown in Example 1. Apparently all of the folinic acid (or folic acid) is not removed when the cells are washed prior to use.

The folinic acid is recovered as in Example 1.

Example 3

Folic acid is added in various concentrations to buffered suspensions of resting cells of *S. faecalis* produced as in Example 2. In addition, 2 mg. per ml. of ascorbic acid is added to otherwise identical aliquots of the suspensions. Each suspension is incubated at 37° C. for 17 hours and then steamed for 10 minutes. The suspensions are then treated with chicken pancreas as in Example 1, steamed and assayed for folinic acid activity. The amount of folinic acid synthesized is reported in units per mg. dry cell weight which is determined after overnight drying at 100° C. of an aliquot of each suspension.

| Suspension | Folinic Acid Activity, Units Per Mg. Cells | |
|---|---|---|
| | No Ascorbic Acid | With Ascorbic Acid |
| Cells alone | 2 | 8.5 |
| Cells plus 10 μg. of folic acid | 332 | 1,000 |
| Cells plus 100 μg. of folic acid | 693 | 1,630 |
| Cells plus 1,000 μg. of folic acid | 720 | 1,800 |

From these data it is clear that large amounts of folinic acid are produced by resting cells of *S. faecalis* when contacted with folic acid. It is also shown that the amount of folinic acid produced in this manner may be increased many fold by the addition of ascorbic acid or its equivalent.

The folinic acid is recovered in purified form according to the method shown in Example 1.

Example 4

The folinic acid production by resting cells of *L. casei* in the presence of folic acid is studied according to the method of Example 2. The following results are obtained:

| Suspension | Folinic Acid Activity, Units Per Mg. Cells | |
|---|---|---|
| | No Ascorbic Acid | With Ascorbic Acid |
| Cells alone | 1.0 | 10 |
| Cells plus 10 μg. of folic acid | .8 | 116 |
| Cells plus 50 μg. of folic acid | 100 | 645 |
| Cells plus 100 μg. of folic acid | 165 | 1,100 |

The folinic acid, produced in this manner is isolated as in Example 1.

Example 5

The production of folinic acid by resting cells of *S. faecalis* in the presence of $N^{10}$ formyl folic acid is determined as in Example 2. The following results are obtained.

| Suspension | Folinic Acid Activity, Units Per Mg. Cells | |
|---|---|---|
| | No Ascorbic Acid | With Ascorbic Acid |
| Cells alone | 18 | 22 |
| Cells plus 10 μg. of $N^{10}$ formyl folic acid | 33 | 63 |

It is thus seen that *S. faecalis* biosynthetically converts $N^{10}$ formyl folic acid to folinic acid and that if this conversion is effected in the presence of ascorbate larger amounts of folinic acid are produced than when ascorbate is not present.

Various changes and modifications of the invention can be made and, to the extent that such variations incorporate the spirit of this invention, they are intended to be included within the scope of the appended claims.

What is claimed is:

1. The process which comprises subjecting a compound of the group consisting of folic acid and $N^{10}$-formylfolic acid to the action of cells of a microorganism of the group consisting of *Streptococcus faecalis* and *Lactobacillus casei* to produce folinic acid, and recovering the folinic acid.

2. The process, according to claim 1, in which growing cells of the microorganism are used.

3. The process, according to claim 1, in which resting cells of the microorganism are used.

4. The process, according to claim 1, in which the action of the cells is carried out in the presence of ascorbate ion.

5. The process which comprises subjecting a compound of the group consisting of folic acid and $N^{10}$-formylfolic acid to the action of cells of a microorganism of the group consisting of *Streptococcus faecalis* and *Lactobacillus casei* to produce a mixture of folinic acid and folinic acid conjugates, subjecting said mixture to the action of an enzyme capable of releasing folinic acid from folinic acid conjugates, and recovering folinic acid from the reaction mixture.

6. The process, according to claim 5, in which growing cells of the microorganism are used.

7. The process, according to claim 5, in which resting cells of the microorganism are used.

8. The process, according to claim 5, in which the action of the cells is carried out in the presence of ascorbate ion.

9. The process, according to claim 5, in which the enzyme is dried chicken pancreas.

References Cited in the file of this patent

UNITED STATES PATENTS 2,483,248    Stokes _____ Sept. 27, 1949

OTHER REFERENCES

Broquist et al.: Jour. Biol. Chem. 202, May 1953, pages 59–66.

Sebrell et al.: The Vitamins, vol. III, 1954, Academic Press Inc., page 89.